W. W. W. H. T. BRAMBLE.
WEIGHING MACHINE FOR GRAIN, &c.
No. 7,503. Patented July 16, 1850.
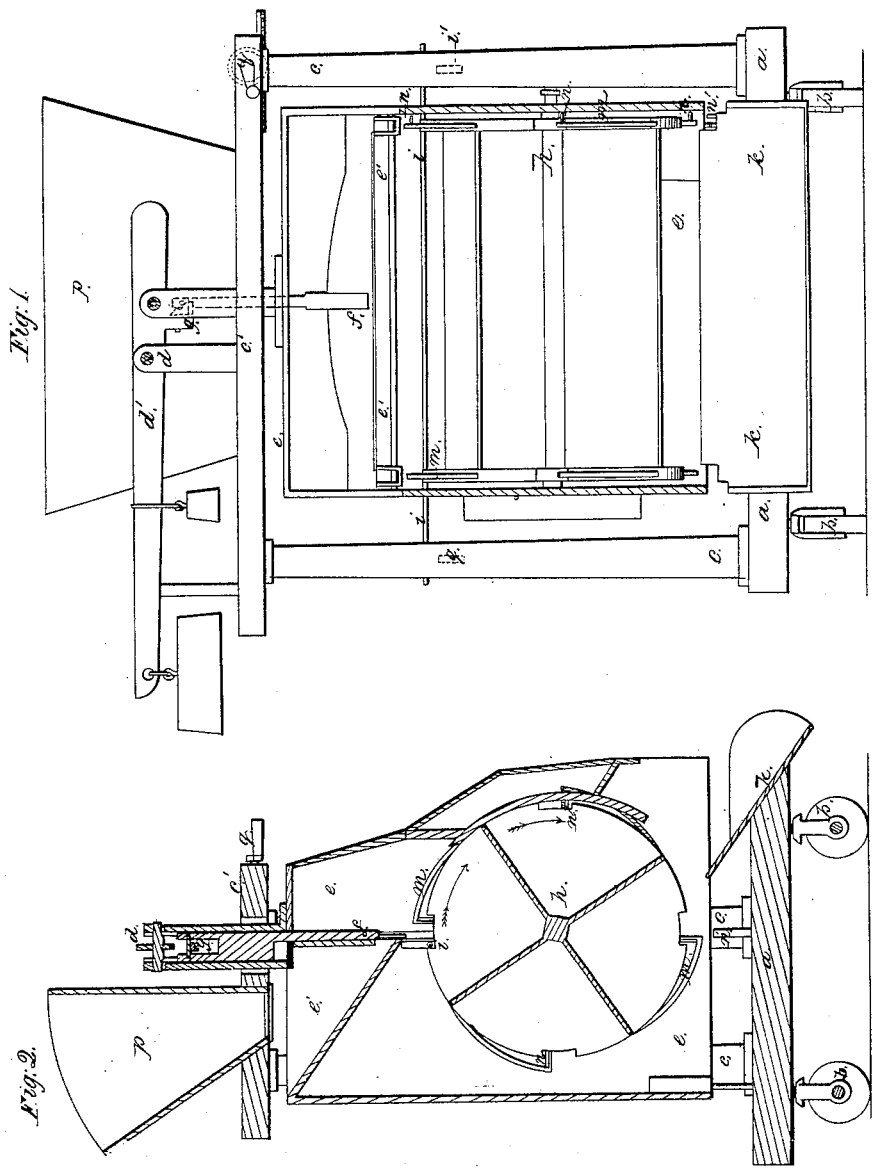

UNITED STATES PATENT OFFICE.

W. W. W. H. T. BRAMBLE, ESQ., OF LAFAYETTE, INDIANA.

SELF-WEIGHING MACHINE FOR GRAIN, &c.

Specification of Letters Patent No. 7,503, dated July 16, 1850.

*To all whom it may concern:*

Be it known that I, W. W. W. H. T. BRAMBLE, of Lafayette, in the county of Tippecanoe and State of Indiana, have invented a Machine for Weighing Grain which is Self-operating and Registers as it Weighs, and that the following is a full, clear, and exact description of the principle or character which distinguishes it from all other things before known and of the usual manner of making, modifying, and using the same, reference being had to the accompanying drawings, of which—

Figure 1 is a front elevation with a portion of the front removed. Fig. 2 a cross section.

The object of my invention is to furnish an apparatus that may be set to weigh or measure any number of bushels of grain without further attendance or care than to set the apparatus, and set the grain to running into it from the loft in which it is contained, the rest of the work is then done by the machine, and registered on an index plate attached thereto.

The construction of the apparatus is as follows: There is a suitable frame, composed of a platform (*a*) on leveling screws (*b*,) with casters or otherwise, and four posts (*c*,) with a top cap or platform (*c'*,), to which the weighing apparatus is suspended. At a suitable point on this cap (*c'*,) there is a fulcrum (*d*,), on which a steelyard (*d'*,) rests, to which a weighing box (*e*) is suspended; the top of this box has a hopper or spout (*e'*,) for receiving the grain, which is closed by a drop gate (*f*,), at proper intervals, as about to be described; the gate is raised and suspended on a hook (*g*,) projecting from the under side of the steelyard, directly under the point of suspension of the box; and when the proper quantity of grain has been received by the hopper below, the box descends, which turns the steelyard, and detaches the gate, the dropping of which stops the further descent of the grain. In the lower part of the weighing box there is what I denominate a revolving hopper (*h*,) which is composed of four radial partitions, with circular ends, form four separate compartments for the reception of the grain, and discharging it alternately as they revolve; on the periphery of the ends are notches, in which a long bar or wire (*i*) rests, to prevent the revolution of the hopper while filling; but when the weighing box descends, this wire strikes certain rests (*i''*,) on the front posts of the frame, and is lifted out of the notches, permitting the hopper to turn in the direction of the arrow, and discharge the grain contained in that compartment below, when it is conducted off in a spout (*k*,) affixed to the platform (*a*).

On each end of the revolving hopper there is a cam (*m*) between each of the divisions, on which cams the ends of the gate (*f*,), or a projection therefrom rests, where it has fallen; and by means of this cam, as the hopper turns, the gate is again raised to its proper elevation, and the hopper is stopped by a projection (*n*,) striking a pin (*n'*,) on the platform (*a*,); at this instant the grain being discharged, the box rises, and the gate is caught on the hook (*g*,) on the steelyard, and held there; the hopper is then detached from the pin (*n'*,) at the bottom, and turns a little further, just so as to clear the ends of the gate from the cams (*m*) and is there held by the bar or wire (*i*) above named, till that compartment of the hopper is filled.

The operation is as follows: The grain is received into a stationary hopper (*p*,) affixed to the cap of the frame, and closed at the bottom by a sliding gate worked back and forth by a hand crank at (*q*,), an ordinary contrivance, that needs no particular description: when this gate is opened the grain descends through the spout (*e'*,) into the revolving hopper (*h*,) and fills the uppermost compartment with the quantity to be weighed, which is determined by the pea on the steelyard; when the due quantity is received the weighing box descends, and the gate (*f*,) is dropped, but the grain continues to run into the spout (*e'*,), and bears the weighing box down till the hopper revolves sufficienty to discharge the grain therefrom, and raises the gate; at this time the hopper being relieved of its load, the box rises, the gate (*f*,) is hooked up, and the charging of the hopper proceeds again without any aid from an attendant.

On the axis of the revolving hopper (*h*,) on one end there is affixed an index, with proper gearing, such as is ordinarily used for indicating motion to register the amount weighed. As apparatus of this kind is so common in machinery, and in such great variety of construction, I have not deemed it necessary to give a minute description of any particular kinds, the common clock being a good illustration of one variety to this apparatus, I attach a stop bolt that shall stop the machine after any number of revolutions; but this is also a well known device to mechanics, and may be done in a variety of ways. I have, in the above description only named grain as the article to be weighed, but it is evident that it is as well adapted to a variety of other articles.

Having thus fully described my improved self operating weighing apparatus what I claim therein as new, and which I desire to secure by Letters Patent is—

The combination of a steelyard, with a weighing box having several compartments which receive the grain alternately, and when a certain quantity has been received the full compartment is discharged, being disengaged by the depressed position of the steelyard; at the same time another compartment is presented for filling, the apparatus being operated by the weight of the grain itself so as to form an automatic weighing machine by which with the aid of a register or index the amount weighed is ascertained, substantially as above set forth.

W. W. W. H. T. BRAMBLE.

Witnesses:
EDWARD EVERETT,
S. W. EVERETT.